(12) United States Patent
Hamada et al.

(10) Patent No.: US 6,240,549 B1
(45) Date of Patent: *May 29, 2001

(54) METHOD AND SYSTEM FOR ANALYZING AND DISPLAYING PROGRAM INFORMATION

(75) Inventors: Seiji Hamada; Yuichi Nakamura; Masahiro Ohkawa; Michio Kikuchi, all of Kanagawa-ken (JP)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,846

(22) Filed: Aug. 18, 1999

Related U.S. Application Data (63) Continuation of application No. 09/075,888, filed on May 11, 1998, now abandoned.

(30) Foreign Application Priority Data

Jun. 27, 1997 (JP) .................................................. 9-171665

(51) Int. Cl.[7] .................................................. G06F 9/445
(52) U.S. Cl. ..................... 717/5; 717/1; 717/2; 717/3; 717/4; 717/8; 345/133; 345/433; 709/106
(58) Field of Search .................................. 717/1, 2, 3, 4, 717/5, 6, 8; 345/133, 433; 709/106

(56) References Cited

U.S. PATENT DOCUMENTS

| | | | |
|---|---|---|---|
| 5,481,712 * | 1/1996 | Silver et al. .............................. | 717/1 |
| 5,500,881 * | 3/1996 | Levin et al. .............................. | 717/5 |
| 5,592,600 * | 1/1997 | De Pauw et al. ...................... | 345/440 |
| 5,740,440 * | 4/1998 | West ........................................ | 717/4 |
| 5,740,444 * | 4/1998 | Frid-Nielsen ............................ | 717/5 |
| 5,781,900 * | 7/1998 | Shoji et al. .............................. | 707/6 |

OTHER PUBLICATIONS

Linos, "Poly CARE: A Tool for Re-engineering Multi-language Program Integrations", IEEE, pp. 338–341, Nov. 1995.*

Linos et al., "CARE: An Environment for Understanding and Re-engineering C Programs", IEEE, pp. 130–139, Sep. 1993.*

* cited by examiner

Primary Examiner—Mark R. Powell
Assistant Examiner—Ted T. Vo
(74) Attorney, Agent, or Firm—Scully, Scott, Murphy & Presser; Casey P. August (57) ABSTRACT

Through an operation of a debugger 57, a process with respect to certain assumed collaboration is carried out for each module such that breakpoints may be set up at appropriate locations in a program. Executing the program, call relations up to a setup time of a breakpoint are stacked on a call stack. Using the debugger 57, these call relations are stored into a collaboration repository 51. A builder 52 is a means for controlling an overall development environment. This builder 52 may call a debugger 57 or another function 53 for displaying program information that comprises a collaboration matrix 54, a call graph 55, a class browser 56 and the like.

13 Claims, 7 Drawing Sheets

```
Chkbook-Win32 Debug

Chkbook classes
    CBookView                          11
    CCheckBookFrame
    CCheckView
        ◇ DoDataExchange()
        ◇ MaybeCommitDirtyCheck()
        ◇ OnUpdata()
        ◇ CCheckView()
        ◇ ~CCheckView()
        ◇ GetDocument()
        ◇ OnAmountNumChange()
        ◇ OnEditCommitCheck()
        ◇ m_dwCents        12
        ◇ m_n Check No
        ◇ m_strData
        ◇ m_strMemo
        ◇ m_strPayTo
    CChkBookApp
    CChkBookDoo
        ◇ ~CChkBookDoo()

Class View
```

```
                                        13
//FormData                //protec
protected:
    //{{AFX_DATA(CCheckView)
    enum {IDD = IDO_CHECK};
    UINT     m_nCheckNo;
    CString  m_strDate;
    CString  m_strMemo;
    CString  m_strPayTo;
    DWORD    m_dwCents;
    //}}AFX_DATA //Attributes
protected:
    CChkBookDoc * GetDocument()
    {
        ASSERT(m_pDocument->Is Kin
        return (CChkBookDoc *)m_p
    }

CCheckView();
```

METHOD AND SYSTEM FOR ANALYZING AND DISPLAYING PROGRAM INFORMATION

This application is a continuation application filed under 35 U.S.C. §120, continuing U.S. patent application Ser. No. 09/075,888 filed on May 11, 1998 now abandoned and claims the benefit of the filing date of that parent application.

BACKGROUND OF THE INVENTION

1. Technical Field

This invention is directed to a method and a system for displaying information of a program under development in a development environment of object oriented programming and, more particularly, to such a method and a system that enable to display only particular classes and methods related to each other.

2. Prior Art

In a conventional class browser, a list of classes, a list of member variables or a list of methods for each class may be displayed. The common variety of displaying form is that uses a tree structure or a list box. Examples of class browsers are shown in FIGS. 1 and 2.

Figure 1:
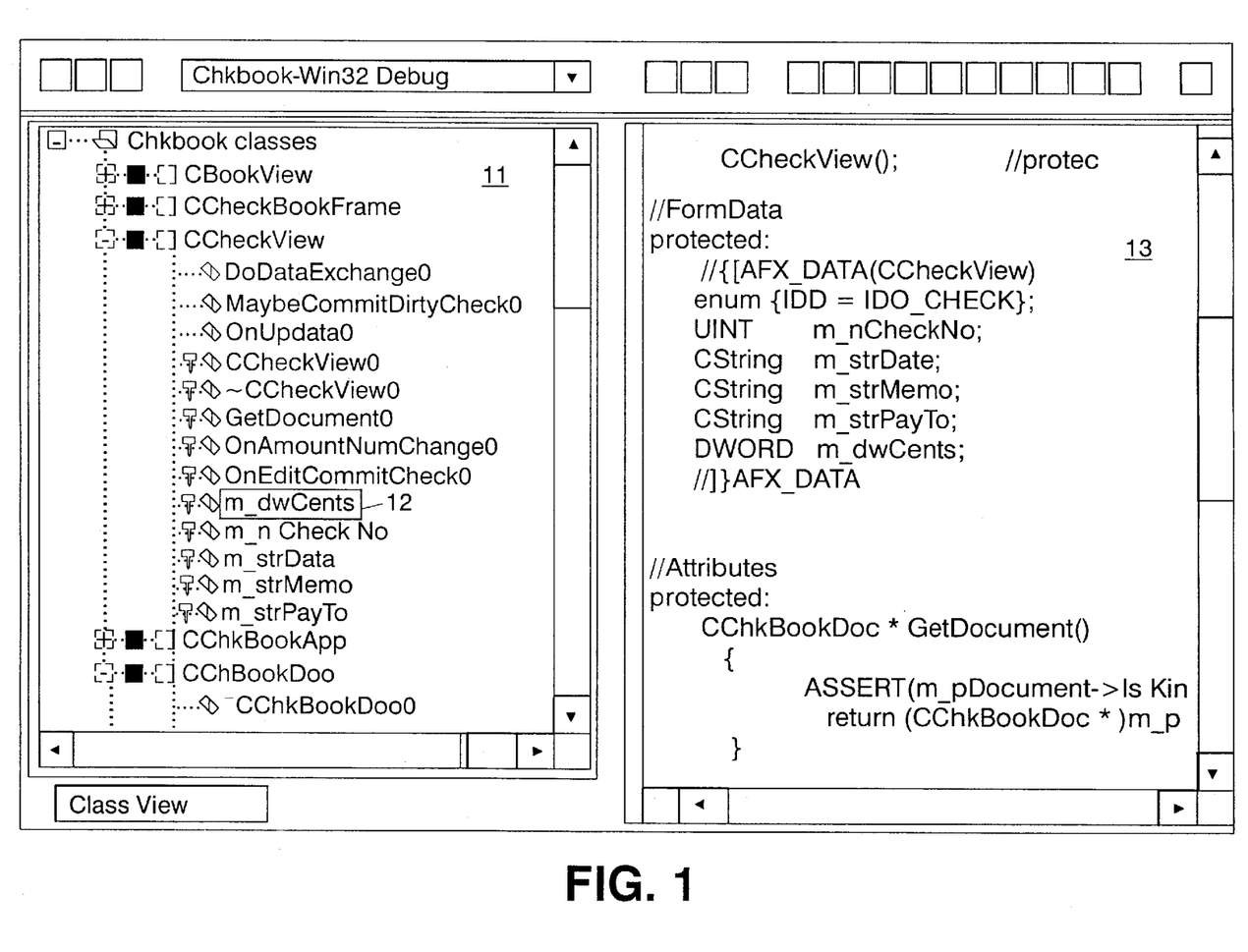
FIG. 1 is a diagram showing an example of a conventional class browser.

In FIG. 1, a window 11 is shown to display classes as well as their member variables and methods (member functions) in the form of a tree structure along with icons representing their respective attributes (public/protected/private). Designating a given member variable 12, "m_dwCents", as shown by the reversely highlighted characters, a portion of a source code corresponding thereto may be displayed in a window 13.

Figure 2:
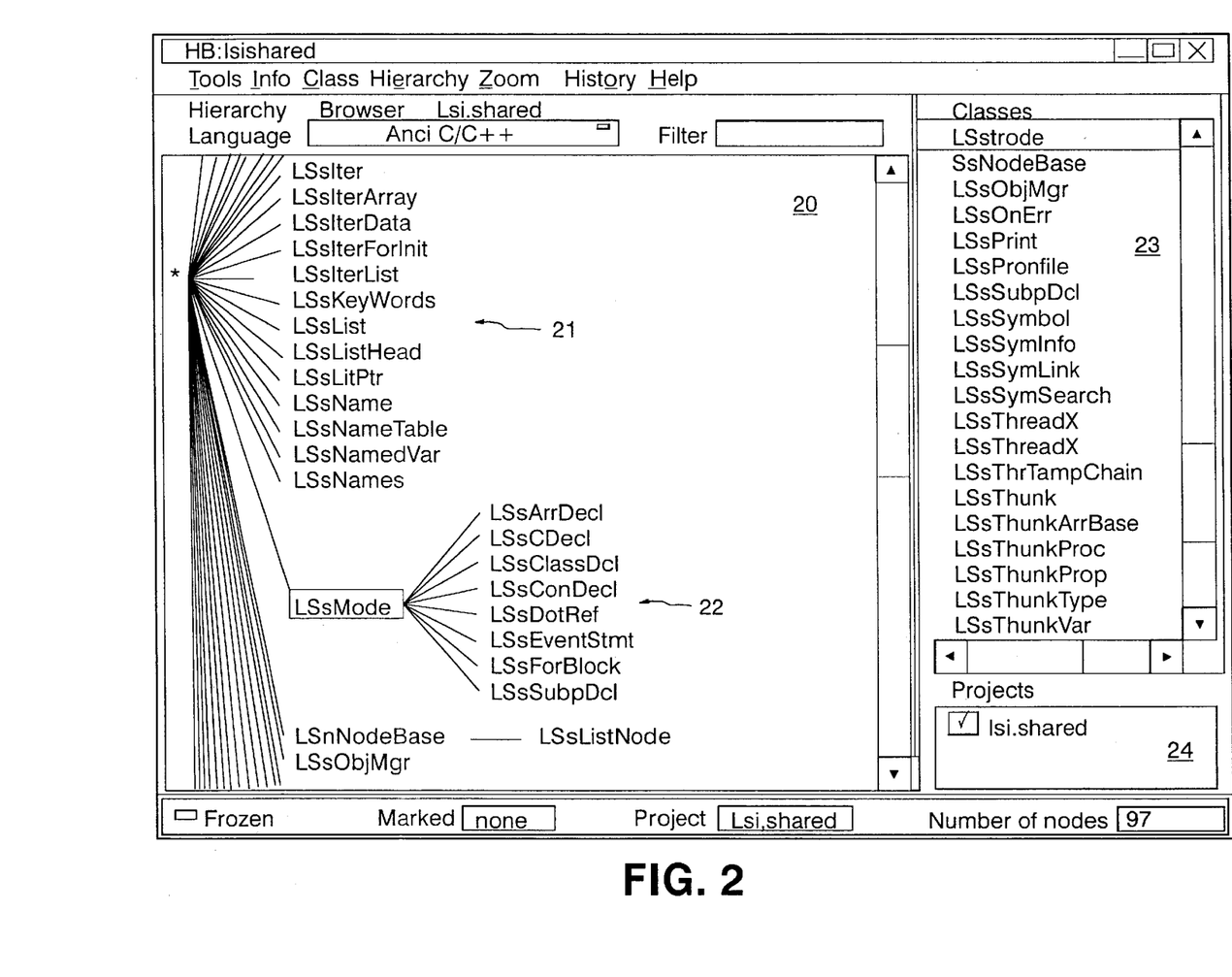
FIG. 2 is a diagram showing another example of a conventional class browser.

In another example shown in FIG. 2, classes may be displayed in a hierarchical manner. In a window 24, there is shown a "project" to be displayed. In a window 23, there is displayed a list of classes at the first hierarchical level of this project. In a window 20, classes may be displayed in a tree structure. The classes being displayed in the window 20 include those classes (21) at the first hierarchical level, and other classes (22) at the second hierarchical level within the designated class "LSsNode".

While such displaying functions are more efficient than directly observing a source code, in an actual application where the number of classes or methods is enormously increased, they have a difficulty to find out a particular member variable or a method. In view of such a problem, Visual Basic 5 (VB) or SNIFF has implemented a function for classifying members based on their attributes. For example, VB displays member variables after classifying them into those relating to display, size and the like, whereas SNIFF may perform a classification according to attributes such as public/protected/private in C++. However, with provision of such a classification function alone, there is no way to furnish an essential solution to find out necessary information from an enormous amount of program information.

Figure 3:
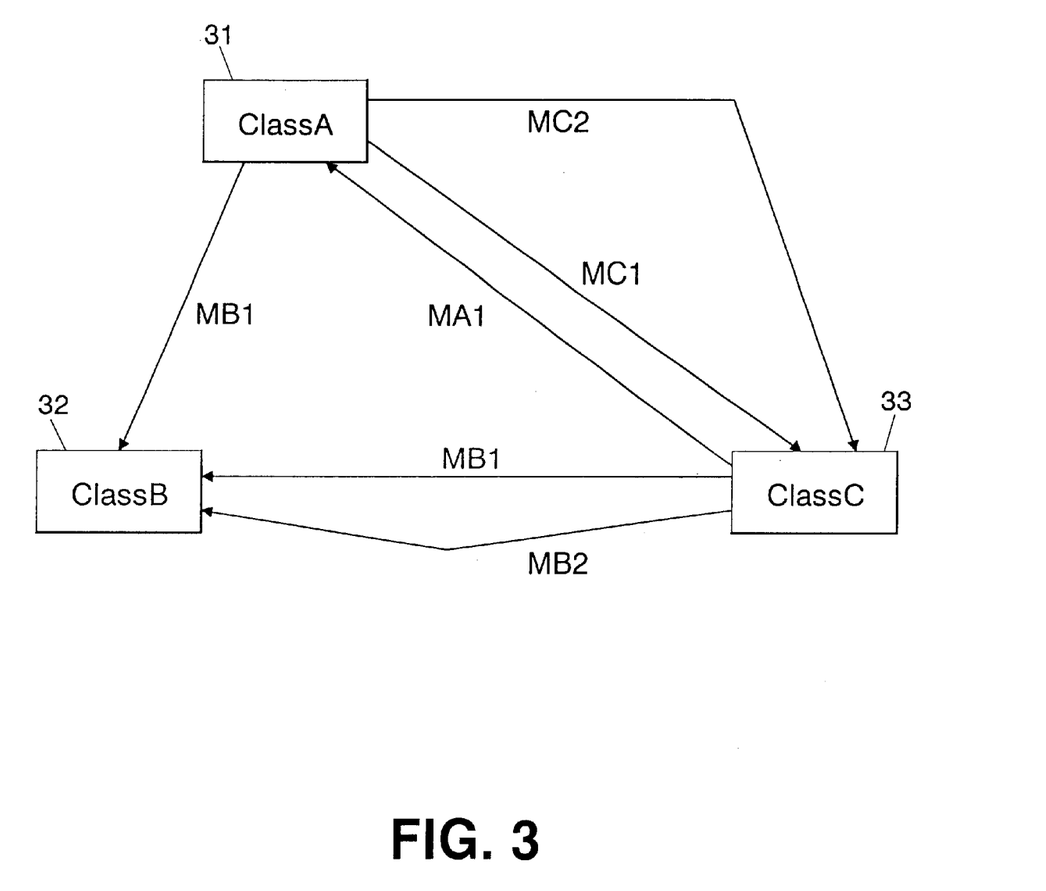
FIG. 3 is a diagram showing an example of a conventional call graph.

Further, as another function for displaying program information, there is a call graph. This is used for displaying call relations between methods or member variables as a directed graph. Its example is shown in FIG. 3. In this call graph, classes are represented as nodes (31 to 33), whereas calls are represented by edges between nodes. A name provided on an edge identifies a called class or a member variable.

While such a graph is useful for a small scaled application, it is not adapted for a large scaled application. This is because, in such a large scaled application, many methods or member variables are defined for each class and, thus, the number of nodes and edges of the graph is explosively increased.

As described above, when program information of a large scaled application under development is to be displayed, there has been a fundamental problem that a large amount of information is presented.

It is therefore an object of the present invention to display necessary program information sorted out in a simple manner while a large scaled program is being developed.

SUMMARY OF THE INVENTION

The present invention provides a method or a system for analyzing and displaying program information in an environment where execution management of a program can be made at a source level and call relations can be extracted from a call stack, characterized by: providing a collaboration repository for storing call relations of methods between classes related as collaboration; moving said call relations of the methods from said call stack to said collaboration repository; and displaying the methods from said collaboration repository in association with the collaboration.

Also, the present invention is characterized by editing collaboration relations with respect to said collaboration repository.

Said displaying of the methods includes displaying collaboration relations in a matrix form or a call graph for each collaboration relation.

Besides, this invention is directed to a recording medium for storing a program implemented for analyzing and displaying program information such that said program is executable to carry out a machine-effected step of displaying methods from a collaboration repository in association with collaboration.

With this invention, it is possible to collect information of collaboration relations in a simple manner and yet to edit/display the collected collaboration, thereby enabling to accurately grasp information of a large scaled program during its development.

BRIEF DESCRIPTION OF THE DRAWINGS

Preferred embodiments of the present invention will now be described by way of example only, with reference to the accompanying drawings in which.

DETAILED DESCRIPTION OF THE PREFERRED EMBODIMENTS OF THE INVENTION

In accordance with the present invention, necessary program information is sorted out according to collaboration between objects. Such collaboration is a concept that has been widely accepted by those skilled in the art who pertain to analysis/design of object oriented programming, and it means a collaborative or cooperative relation between objects that is associated with a particular process or task. More particularly, it means a call relation in a given class.

Figure 4A:
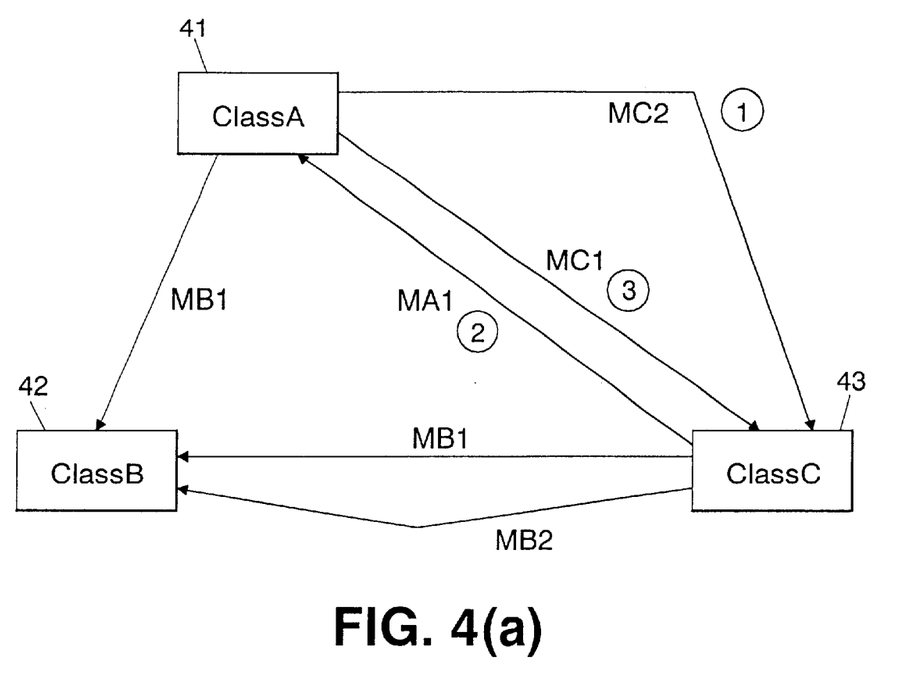
FIG. 4 is a diagram showing collaboration and a call stack of this invention.

Using this collaboration with respect to a given class, it is possible to sort out not only classes required by this class but also member variables and methods in this class. In FIG. 4(a), there is shown a call graph similar to that of FIG. 3. In this FIG. 4(a), class "A" 41 is shown to be in collaboration with class "C" 43 with respect to a given process, as indicated by thick lines. Noting this process alone indicated by the thick lines, it is possible to sort out member variables and methods in a simple manner.

Thus, if a user assumes certain collaboration and successively defines associated sets of class member variables or methods, it becomes possible to sort out program information for each collaboration.

While, in case of defining collaboration, a user may designate classes or methods by himself/herself, such an approach is not realistic because of extraordinary efforts required in doing so. Accordingly, this invention makes utilization of a call stack that is used in debugging. This is described below with reference to FIG. 4(b).

Figure 4B:
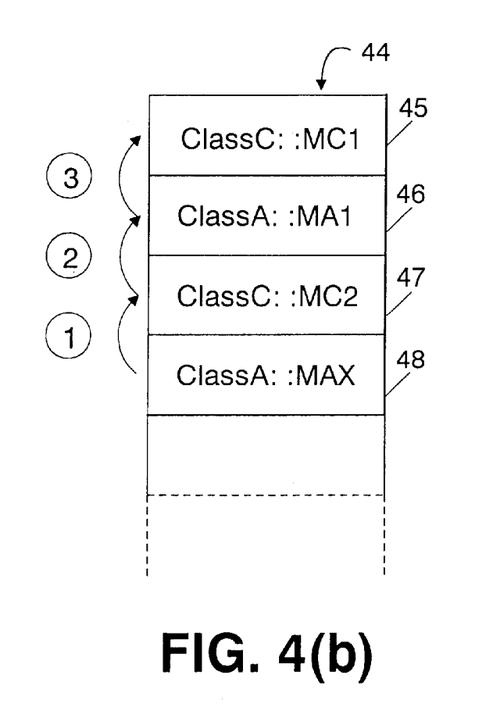

In a conventional debugger, while a program is being executed, the program is suspended at a location which is set to be a breakpoint, thereby enabling to observe a call stack at this point of time. First, we will explain this call stack.

By way of example, it is assumed that a pseudo code shown below in a simplified form is executed using a debugger.

```
ClassA::MAX ( ) {
. . .
   ClassC::MC2 ( ) /* (1) */
. . .
}
ClassC::MC2 ( ) {
. . .
   ClassA::MA1 ( ) /* (2) */
. . .
}
ClassA::MA1 ( ) {
. . .
   ClassC::MC1 ( ) /* (3) */
. . .
}
ClassC::MC1 ( ) {
. . .
   ClassB::MB1 ( )
   !BREAK /* Setup of Breakpoint */
. . .
}
```

First, method "MC2" of class "C" is called by method "MAX" of class "A". At this time, method "MAX" of class "A" is stacked on a call stack 44 as a caller (48). Then, from the called method "MC2" of class "C", method "MA1" of class "A" is called. Thus, on the call stack 44, method "MC2" of class "C" is stacked as a caller (47).

Next, method "MA1" of class "A" calls method "MC1", of class "C", and method "MA1" of class "A" is stacked on the call stack 44 as a caller (46). Next, method "MC1"of class "C" calls method "MB1" of class "B", and method "MC1" of class "C" is stacked on the call stack 44 as a caller (45). At this point, the program reaches a breakpoint and execution of the program is suspended.

Content of the call stack up to a point of time of this breakpoint may be observed by a debugger as a snapshot.

Now, by using the call relations between methods stacked on the call stack 44 as shown in FIG. 4(b), it is possible to read those relations (1), (2), (3) as shown by the thick lines in FIG. 4(a), in the order stacked on the call stack 44.

This invention intends to grasp an assumed collaboration relation based on the actual conditions by using aforesaid call stack.

Figure 5:
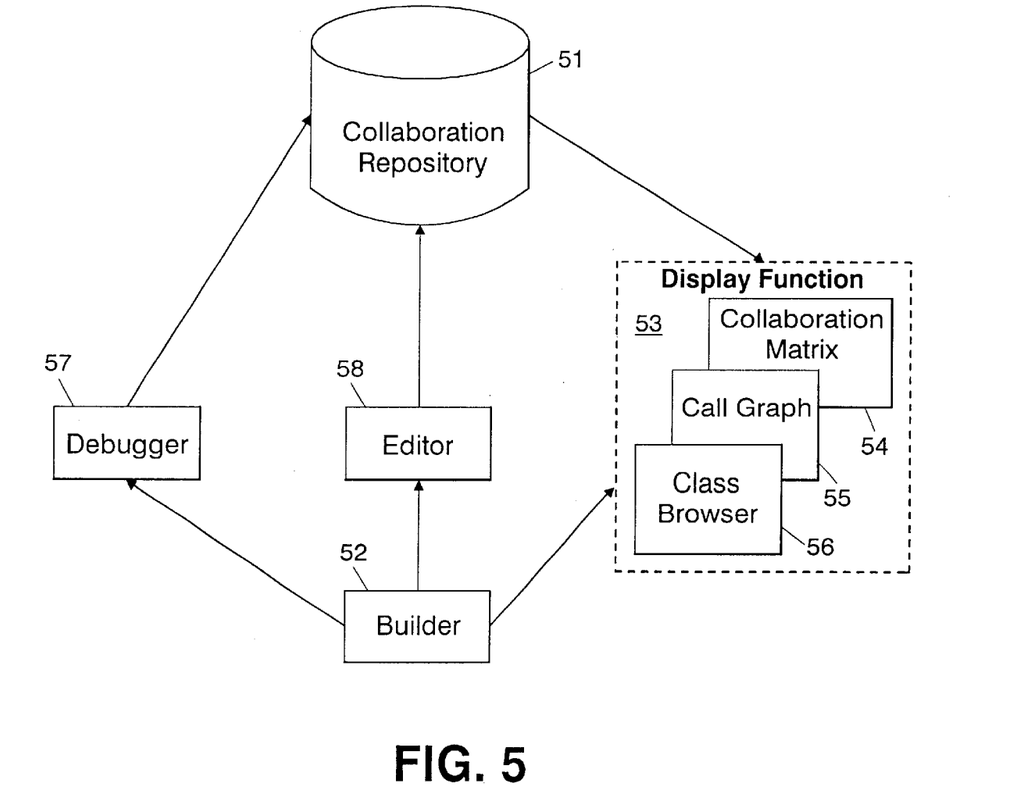
FIG. 5 is a diagram showing a development environment of this invention.

Here, referring to FIG. 5, a development environment using the concept of collaboration is described. A builder 52 is a means for controlling the overall development environment. This builder 52 may call a debugger 57 or another function 53 for displaying program information that comprises a collaboration matrix 54, a call graph 55, a class browser 56 and the like. This function 53 for displaying program information will be described below in more detail.

First, through an operation of the debugger 57, a process with respect to certain assumed collaboration is carried out for each module such that breakpoints may be set up at appropriate locations in a program. Then, as previously described, call relations up to a setup time of a breakpoint have been stacked on the call stack. Using the debugger 57 or another dedicated tool, a name of the assumed collaboration or the like is appended to such call relations and, then, these call relations are stored into a collaboration repository 51. Repeating this for several times, it is possible to collect more detailed and comprehensive collaboration information. Also, when the call relations in the call stack are moved to the collaboration repository 51, it is possible to select some methods to be moved from the call stack.

As described, using the debugger 57, it is possible to collect and store information of related classes for each collaboration into the collaboration repository 51. Also, using a collection of methods for each collaboration stored into the collaboration repository 51, it is possible to display the program information in various ways.

Since such collaboration stored into the collaboration repository 51 may not be used as it is in some cases, it is necessary to provide a function for editing such collaboration. For this purpose, an editor 58 is provided for accomplishing a function of editing the collaboration repository 51. This editor 58 may be activated by the builder 52.

Figure 6:
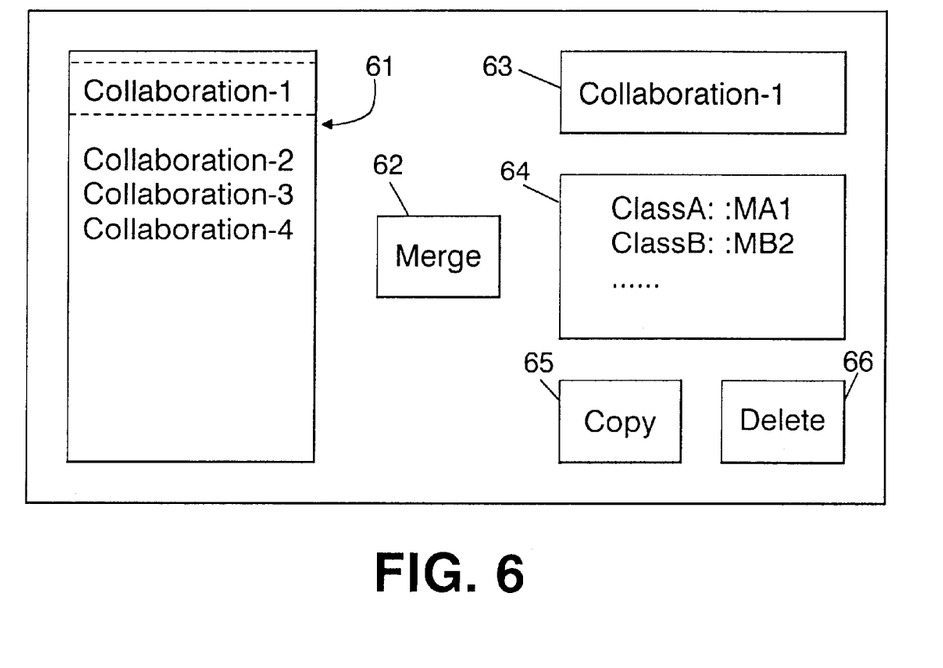
FIG. 6 is a diagram showing an editor for editing collaboration of this invention.

This editor 58 is described with reference to its display screen shown in FIG. 6. In a left window 61, a list of collaboration is displayed such that certain collaboration to be edited is selected therefrom. In a right window 64, a list of methods included in the selected collaboration is displayed. Using a copy button 65 or delete button 66 at the lower part, a method included in the selected collaboration may be copied or deleted. In case of merging a method included in another collaboration, a merge button 62 at the center part may be used.

As the display function 53 using collaboration, the class browser 56 is first described with reference to its display screen of FIG. 7.

Figure 7:
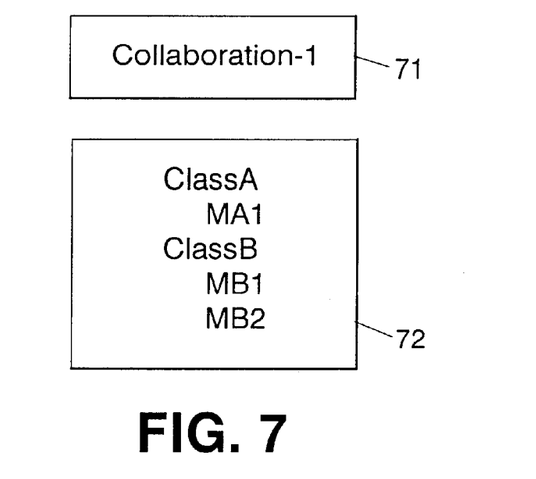
FIG. 7 is a diagram showing an example of a class browser of this invention.

FIG. 7 shows an example of the class browser 56 utilizing a list box. In an upper window 71, a combo box 71 is provided for designating collaboration. If nothing is designated in the combo box 71 (default), it is interpreted as designating all classes and, thus, all classes are displayed in a lower window 72. On the other hand, if certain collaboration is entered into this combo box 71, only those classes and methods associated with the collaboration designated in this combo box 71 are displayed.

Figure 8:
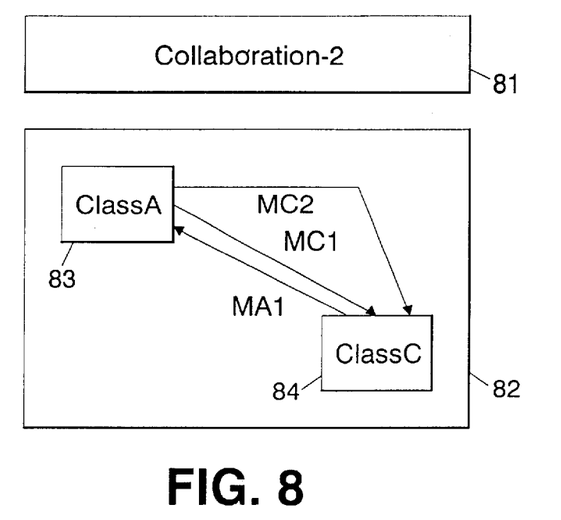
FIG. 8 is a diagram showing an example of a call graph of this invention.

FIG. 8 shows an example of the call graph 55 utilizing collaboration. Similarly to FIG. 7, a combo box 81 is provided in an upper part for designating collaboration. In the case of such call graph, if nothing is designated in the combo box 81 (default), nothing is displayed in a lower window 82. On the other hand, if certain collaboration is entered into the combo box 81, a graph of those classes and methods associated with the entered collaboration is displayed in the window 82.

Figure 9:
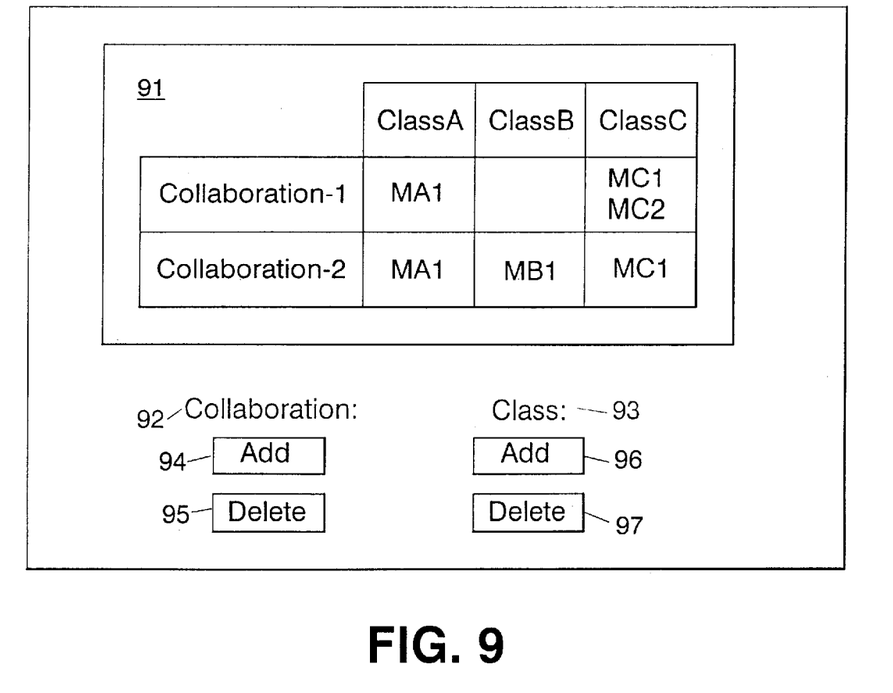
FIG. 9 is a diagram showing a collaboration matrix of this invention.

FIG. 9 shows an example of displaying the collaboration matrix 54. A table displayed in an upper window 91 is the collaboration matrix, which collectively displays relationships between collaboration and methods included in respective classes in a matrix form. Referring to the table shown in FIG. 9, for example, collaboration-1 is associated with method "MA1" in class "A", as well as methods "MC1" and "MC2" in class "C". Also, collaboration-2 is associated with method "MA1" in class "A", method "MB1" in class "B" and method "MC1" in class "C". Further, it is seen that method "MA1" in class "A" and method "MC1" in class "C" are associated with both of collaboration-1 and collaboration-2 respectively.

Using buttons 94 to 97 in a lower part, it is possible to add or delete collaboration or classes to/from the displaying window 91. By way of example, if the collaboration-add button 94 is clicked, a list box of collaboration appears. If certain collaboration is selected there, the selected collaboration is added to the table so that its associated method is displayed in a cell of the corresponding class.

Further, if a method displayed in a cell is clicked, a window of the editor for displaying a source code is opened, thereby enabling to confirm a source code of the selected method or to modify the same.

Further, with respect to a portion that executes its function by a program, it is possible to store the program on a recording medium such that the program may be read therefrom by a computer system for implementing the function. This recording medium may be a floppy disk, a CD-ROM, a magnetic tape, a ROM cassette or the like.

In the above described arrangement, information of call relations between classes is obtained by using a call stacker, which is generated by a debugger through execution of a program up to a breakpoint. However, it is sufficient to manage execution of a program at a source level and, thus, such information of call relations between classes may be alternatively obtained by causing a profiler to have a function for recording a call stack.

As described above, in accordance with this invention, it is possible to display program information for each collaboration unit that is highly effective in facilitating development of a large scaled program.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for analyzing and displaying program information in an environment where execution management of a program can be made at a source level, comprising the steps of:

providing a collaboration repository for storing call relations of methods between classes related as selected collaboration;

stacking the call relations in a call stack during a program execution;

extracting said call relations of the methods from the call stack used in a programming environment;

collecting in said collaboration repository said call relations of said selected collaboration wherein one or more said selected collaboration associated with one or more said call relations of methods are stored in said collaboration repository for gathering source code information for said selected collaboration; and displaying collaboration information from said collaboration repository during a development stage of the source code.

2. The method as set forth in claim 1, further comprising the step of interactively editing collaboration relations with respect to said collaboration repository.

3. The method as set forth in claim 1, wherein said step of displaying the methods displays collaboration relations in a matrix form.

4. The method as set forth in claim 2, wherein said step of displaying the methods displays collaboration relations in a matrix form.

5. The method as set forth in claim 1, wherein said step of displaying the methods displays a call graph for each collaboration relation.

6. The method as set forth in claim 2, wherein said step of displaying the methods displays a call graph for each collaboration relation.

7. A system for analyzing and displaying program information having an environment wherein execution management of a program can be made at a source level, comprising:

a collaboration repository for storing call relations of methods between classes related as selected collaboration;

a call stack for stacking the call relations during a program execution;

means for extracting said call relations of the methods from the call stack used in a programming environment for collecting in said collaboration repository said call relations of said selected collaboration wherein one or more said selected collaboration associated with one or more said call relations of methods are stored in said collaboration repository for gathering of source code information for said selected collaboration; and means for displaying collaboration information from said collaboration repository during a development stage of the source code.

8. The system as set forth in claim 7, further comprising means for interactively editing collaboration relations with respect to said collaboration repository.

9. The system as set forth in claim 7, wherein said means for displaying the methods displays collaboration relations in a matrix form.

10. The system as set forth in claim 8, wherein said means for displaying the methods displays collaboration relations in a matrix form.

11. The system as set forth in claim 7, wherein said means for displaying the methods displays a call graph for each collaboration relation.

12. The system as set forth in claim 8, wherein said means for displaying the methods displays a call graph for each collaboration relation.

13. A recording medium for storing a program implemented for analyzing and displaying program information in an environment where execution management of a program can be made at a source level, said program being executable to carry out a machine-effected steps of:

generating a collaboration repository for storing call relations of methods between classes related as selected collaboration;

stacking the call relations in a call stack during a program execution;

extracting said call relations of the methods from the call stack used in a programming environment;

collecting in said collaboration repository said call relations of said selected collaboration wherein one or more said selected collaboration associated with one or more said call relations of methods are stored in said collaboration repository for gathering source code information for said selected collaboration;

displaying collaboration information from a collaboration repository during a development stage of the source code.

* * * * *